United States Patent [19]

Sau

[11] Patent Number: 4,990,563

[45] Date of Patent: Feb. 5, 1991

[54] WATER SOLUBLE SILATED POLYVINYL ALCOHOL

[75] Inventor: Arjun C. Sau, Newark, Del.

[73] Assignee: Aqualon Company, Wilmington, Del.

[21] Appl. No.: 411,812

[22] Filed: Sep. 25, 1989

[51] Int. Cl.$^5$ .................................................. C08F 8/00
[52] U.S. Cl. ...................................................... 525/61
[58] Field of Search .......................................... 525/61

[56] References Cited

U.S. PATENT DOCUMENTS

| | | | |
|---|---|---|---|
| 3,959,242 | 5/1976 | Watts et al. ......................... | 526/9 |
| 4,016,129 | 4/1977 | Miyosawa ............................ | 524/557 |
| 4,097,436 | 6/1978 | Buning et al. ...................... | 260/29.6 H |
| 4,219,591 | 8/1980 | Buning et al. ...................... | 427/387 |
| 4,425,403 | 1/1984 | Taniguchi et al. .................. | 428/331 |
| 4,480,072 | 10/1984 | Mallon ................................. | 525/61 |
| 4,489,117 | 12/1984 | Ono et al. ........................... | 428/127 |
| 4,567,221 | 1/1986 | Maruyama et al. ............. | 525/61 X |

Primary Examiner—Joseph L. Schofer
Assistant Examiner—J. M. Reddick
Attorney, Agent, or Firm—James K. Luchs

[57] ABSTRACT

A silated polyvinyl alcohol with a degree of substitution (D.S.) between 0.005 and 0.5 is prepared by reacting polyvinyl alcohol with a silating agent. Preferred silating agents are 3-glycidoxypropyltrimethoxysilane or vinyltrimethoxysilane. An alkali metal or ammonium salt of the silated polyvinyl alcohol can self-crosslink in the presence of atmospheric carbon dioxide to form a water resistant film which is soluble in caustic.

2 Claims, No Drawings

WATER SOLUBLE SILATED POLYVINYL ALCOHOL

FIELD OF THE INVENTION

The invention relates to chemically modified water soluble polymers. In particular the invention relates to a new class of silated polyvinyl alcohols with new and useful properties.

BACKGROUND OF THE INVENTION

U.S. Pat. Nos. 4,097,436 and 4,219,591 describe a saponified vinyl acetate-vinyl alkoxysilane polymer produced by contacting a solution of vinyl acetate-vinyl alkoxysilane copolymer with an alcoholic solution of an alkali metal hydroxide and recovering a precipitated product. Further described is a process for contacting an acidified solution of a vinyl acetate vinyl alkoxysilane copolymer with a substrate to form a water insoluble film.

U.S. Pat. No. 4,425,403 describes a lens coating composition prepared by reacting an acid hydrolyzed silane coupling agent with an aqueous solution of polyvinyl alcohol (91 to 94% saponification) and silica gel.

U.S. Pat. No. 3,959,242 describes a silane grafted polyvinyl alcohol polymer prepared by stepwise reaction of polyvinyl alcohol (87 89% saponified) with a silane coupling agent in the presence of an acid catalyst. These graft polymers are suitable for a mold release surface for preparing cast articles.

U.S. Pat. No. 4,489,117 discloses a magnetic tape abrasion coating produced by coating a melt extruded polyethylene terephthalate film with an aqueous solution of a water soluble polymer such as polyvinyl alcohol and a silane coupling agent and heat stretching the film. A water soluble polymer with a molecular weight of 100,000 to 1,000,000 is preferred along with a dimethyoxysilane or trimethoxysilane.

Silane coupling agents were disclosed in U.S. Pat. No. 4,480,072 as a useful means to crosslink between organic and inorganic materials. A common feature of this and other references is crosslinking organic polyvinyl alcohol polymers and copolymers with an inorganic silane coupling agent without forming a new composition of matter containing nonhydrolyzable covalent bonds. Yet in spite of what was known in the art, it remained for the present invention to introduce a new class of water soluble silated polyvinyl alcohols and alkali salts useful for preparing water resistant films.

SUMMARY OF THE INVENTION

A new composition of matter comprises a water soluble silated polyvinyl alcohol with nonhydrolyzable covalent bonds useful in the form of a film or powder for industrial, pharmaceutical, medical and cosmetic applications.

The water soluble polymer comprises an organosilyl modified polyvinyl alcohol homopolymer or copolymer having a silyl substituent covalently bonded to the polymer or copolymer wherein the number of silyl species per monomeric unit ranges from 0.005 to 0.5. Particularly useful for film forming applications is an anionic polymer salt comprising a silated polyvinyl alcohol homopolymer or copolymer wherein an organosilyl species is covalently bonded through an organofunctional group and the degree of silyl substitution of the polymer or copolymer is between 0.005 and 0.2. In particular, an alkali metal or ammonium salt cast or coated from an aqueous solution can self-crosslink in the presence of atmospheric carbon dioxide to form a water resistant film which is soluble in caustic.

A method of preparing a water soluble silated polyvinyl alcohol comprises the steps:

(1) preparing a polyvinyl alcohol homopolymer or copolymer with a degree of hydrolysis between 90 and 100%;

(2) reacting the homopolymer or copolymer in an alkaline environment at a temperature above 50° C. in the presence of a silating agent; and (3) recovering a silated polyvinyl alcohol homopolymer or copolymer with a degree of silyl substitution between 0.005 and 0.5.

A silated polymer may comprise a copolymer of vinyl alcohol and vinyl acetate reacted with glycidoxypropyltrimethoxysilane (GPTMS) or vinyltrimethoxysilane (VTMS).

DETAILED DESCRIPTION OF THE INVENTION

Polyvinyl alcohols are synthetic polymers which can be modified and substituted to vary chemical and physical properties. Modification can be accomplished through the hydroxyl groups on the polyvinyl chain. Similarly, it was known that silane coupling agents could react with these hydroxyl groups such that the polymer could be crosslinked.

Now a new class of water soluble silated polyvinyl alcohols has been discovered to further expand on previously known modifications and substitutions. It was surprising to find that reactions and methods not found in the prior art gave novel and useful compositions of matter when hydrolyzed polyvinyl alcohol (PVA) was directly modified with organosilanes to a particular degree of substitution.

Organosilanes useful for the practice of the invention have the following general structure:

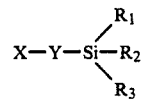

where,

Y = A hydrocarbyl spacer group (composed of at least one methylene group) between X and the silicon atom.

$R_1$, $R_2$ and $R_3$ are groups attached to the silicon. These groups could be either hydrocarbyl or hydrolyzable such as halogen, alkoxy, aryloxy, acyloxy, siloxy or amine. They could also constitute a combination of hydrocarbyl and hydrolyzable groups just mentioned. However, at least one of them must be hydrolyzable.

X = a functional group capable of reacting with the hydroxyl function of the polymer.

The following X groups could be used to incorporate the silyl substituent into the polymer.

(i) Cl,Br,I (halide)

(ii) —N=C=O (isocyanate)

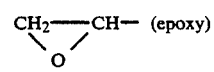 (iii)

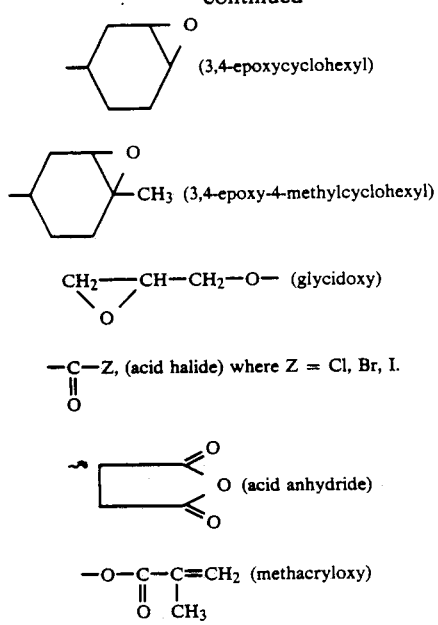

(iv) (3,4-epoxycyclohexyl)

(v) (3,4-epoxy-4-methylcyclohexyl)

(vi) $CH_2\!\!-\!\!CH\!\!-\!\!CH_2\!\!-\!\!O\!-$ (glycidoxy), with O bridging (vii) $-\!\!\underset{\underset{O}{\|}}{C}\!\!-\!\!Z$, (acid halide) where $Z = Cl, Br, I$.

(viii) (acid anhydride)

$-\!\!O\!\!-\!\!\underset{\underset{O}{\|}}{C}\!\!-\!\!\underset{\underset{CH_3}{|}}{C}\!\!=\!\!CH_2$ (methacryloxy)

It has been found that polyvinyl alcohol reacts with 3-glycidoxypropyltrimethoxysilane (GPTMS) in the presence of NaOH to form the following silated PVA (SIL-PVA):

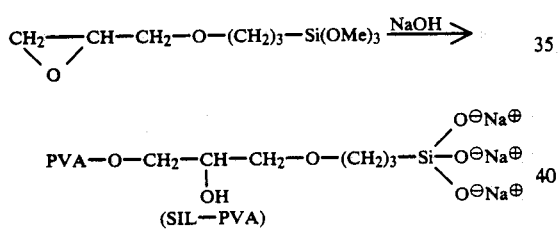

The SIL PVA was soluble in hot water at 60°–97° C. depending on the molecular weight of the PVA used. These novel materials are soluble in alkaline solution (pH~10–12). Under acidic environment, these polymers are insoluble. However, addition of an acid to a dilute solution(1–3 wt %) of SIL PVA does not lead to solution viscosity enhancement or precipitation of the polymer.

One of the interesting properties of SIL PVA is its ability to undergo self crosslinking when its aqueous solutions are air dried. The films formed by air drying the SIL-PVA are water- and acid resistant but alkali soluble. Besides self crosslinking, SIL PVA can also crosslink other water soluble polymers, such as hydroxyethylcellulose (HEC), hydroxypropylcellulose (HPC), carboxymethylcellulose (CMC), carboxymethylhydroxyethylcellulose (CMHEC), polyvinyl alcohol (PVA), polyethyloxazoline, etc. Since SIL-PVA is anionic, it crosslinks with polyvalent metal ions, such as $Ti^{+4}$ to form viscoelastic gels.

Solution cast SIL PVA films are clear and flexible. They are water resistant despite their ability to imbibe a significant amount of water. These hydrated films are transparent, elastic and tacky. Although insoluble in water and acids, they dissolve in alkali.

SIL-PVA exhibits good adhesive strength to various cellulosic materials and substrates containing surface hydroxyls.

Unlike the prior art, the degree of hydrolysis of PVA is critical to form the SIL-PVA of the invention. Only 100% hydrolyzed PVA, i.e. PVA containing no residual acetate groups reacts with GPTMS under alkaline environment to yield a completely soluble SIL-PVA. PVA's having about 94–98% degree of hydrolysis react with GPTMS to form water-soluble SIL PVA containing some insolubles. The higher the degree of PVA hydrolysis the lower the amount of insolubles.

The following examples illustrate the practice of the invention without being exhaustive.

EXAMPLE 1

Preparation of SIL-PVA by the Reaction of PVA With GPTMS

To a one-liter resin kettle reactor equipped with a reflux condenser and an overhead stirrer and containing hexane (300 g) and caustic solution (4 g of NaOH dissolved in 30 g of water) was added PVA powder (50 g "as is") (Aldrich; 100% hydrolyzed; molecular weight ~14,000). The resulting mixture was vigorously mixed for 30 minutes at room temperature in a nitrogen atmosphere. Then GPTMS (5 g) was added to the PVA slurry and the resulting reaction mixture was heated at 69° C. for 5 h.

The reaction mixture was cooled to room temperature, treated with glacial acetic acid (2 g) and filtered. The residue was washed twice with acetone/water (80:20 w/w) mixture. After dehydration with acetone, the polymer was dried in a fluid bed drier at 50° C. for 30 minutes.

Properties

The SIL PVA was soluble in hot water (95 97° C.). The pH of a 1% (w/w) solution was 12.7. A solution cast film was insoluble in boiling water.

Analytical

Moisture-7.15%
Ash (Na$_2$SO$_4$)-1.85%
Silicon-0.92%

EXAMPLE 2

Preparation of SIL-PVA in t-Butyl Alcohol

Example 1 was repeated using the following reagents in a stainless steel sealed reactor.
(1) t-Butyl alcohol - 600 g
(2) Sodium hydroxide-8 g
(3) Water-60 g
(4) Polyvinyl alcohol (Aldrich-100 g ("as is") (100% hydrolyzed; mol. wt. ~14,000)
(5) GPTMS-15 g
(6) Glacial acetic acid-4 g Properties The SIL-PVA was insoluble in hot water at 90° C. The pH of a 1% (w/w) slurry was 11.7. After adjusting the pH to 12.2 with NaOH solution and heating the SIL PVA slurry at 98° C. for several hours, the polymer completely dissolved. A solution cast film was insoluble in hot water.

Analytical

Moisture 2.56%

Ash (Na$_2$SO$_4$)12.24%
Silicon-1.08%

EXAMPLE 3

Preparation of SIL PVA in t-Butyl Alcohol

Example 2 was repeated using 9.5 g of GPTMS.

Properties

The SIL PVA was soluble in hot water (90° C.). A solution cast film was hot water insoluble.

Analytical

Moisture-4.86%
Ash (Na$_2$SO$_4$)-7.38%
Silicon 1%

EXAMPLES 4 to 11

The preparation and properties of various SIL-PVA's under different conditions are summarized in Table 1 and containing dimethylacetamide (400 g) was added PVA (10g) (Aldrich; 88% hydrolyzed; mol. wt. 125,000). The resulting slurry was heated at 60° C. for 15 minutes to bring about complete dissolution of the PVA.

After cooling to room temperature, isocyanatopropyl trimethoxysilane (1 g) and two drops of dibutyltin dilaurate were added to the polymer solution. The resulting reaction mixture was stirred at room temperature in a nitrogen atmosphere for 25 h.

The polymer was precipitated by slowly adding the reaction mixture to a strongly agitated acetone bath. The precipitate was washed with acetone and dried in a convection oven at 50° C for 2 h.

Properties

The isolated polymer was insoluble in water (pH of 1% w/w slurry =7.3). To this slurry was added sodium hydroxide solution to adjust the pH to 12.5. The alkalized slurry was heated at 70° C. to obtain a clear solu-

TABLE 1

| Example No. | PVA Used | Weight of PVA (g) | Hexane (g) | NaOH (g) | H$_2$O (g) | GPTMS (g) | Reaction Temp. (°C.) | Reaction Time (h) | Moisture (%) | Ash (Na$_2$SO$_4$) (%) | Silicon (%) | Solubility |
|---|---|---|---|---|---|---|---|---|---|---|---|---|
| 4 | 1 | 200 | 900 | 16 | 120 | 30 | 68 | 5 | 6.67 | 11.29 | 1.56 | SH |
| 5 | 2 | 80 | 400 | 6 | 20 | 4 | 95 / 115 | 1.5 / 2 | — | — | — | I |
| 6 | 3 | 200 | 900 | 16 | 120 | 30 | 68 | 5 | 5.46 | 9.86 | 1.58 | SH |
| 7 | 4 | 200 | 900 | 16 | 120 | 30 | 68 | 5 | 7.27 | 11.98 | 1.64 | SH |
| 8 | 5 | 200 | 900 | 16 | 120 | 30 | 68 | 5 | 4.07 | 11.52 | 1.07 | PSH |
| 9 | 6 | 30 | 500 | 5 | 10 | 5 | 85 | 1.5 | 11.20 | 20.86 | 1.87 | I |
| 10 | 2 | 20 | 400$^a$ | 2.5 | 3 | 3 | 60 | 4 | — | — | — | I |
| 11 | 6 | 100 | 500$^b$ | c | — | 10 | 55 | 2 | 1.71 | 0.69 | 0.017 | SC |

PVA$^1$100% Hydrolyzed PVA; MW 78,000 (Aldrich)
PVA$^2$100% Hydrolyzed PVA; MW 14,000 (Aldrich)
PVA$^3$AIRVOL 107 (98% hydrolyzed PVA available from Air Products); MW 11,000–31,000
PVA$^4$Elvanol 75-15 (available from DuPont)
PVA$^5$96% Hydrolyzed PVA; MW 78,000 (Aldrich)
PVA$^6$88% Hydrolyzed PVA; MW 96,000 (Aldrich)
$^a$Dimethylacetamide was used as the reaction solvent
$^b$Tetrahydrofuran was used as the reaction solvent
$^c$Tribuytlamine (0.25 g) was used as the catalyst
SH - Soluble in hot water at 90° C.
PSH - Partially (90–95%) soluble in hot water at 90° C.
I - Insoluble
SC - Soluble in cold water Examples 8 and 9 illustrate the importance of having a PVA with a degree of hydrolysis at 90% or higher in order to form a soluble SIL-PVA.

EXMAPLE 12

Preparation of SIL-PVA in Dimethylformamide (DMF) in the Presence of NaOH

Polyvinyl alcohol (Aldrich) (10 g; 88% hydrolyzed; mol. wt. ~96,000) was dissolved in dimethylformamide (400 g) at 60° C. in a one liter round bottomed flask. To the polymer solution were added NaOH powder (0.5 g) and GPTMS (0.5 g). The resulting reaction mixture was heated at 60° C for 4h and cooled to room temperature when a dark brown product separated out.

The product was insoluble in boiling water and caustic.

EXAMPLE 13

Preparation of SIL-PVA by the Reaction of PVA (88% Hydrolyzed) with Isocyanatopronyltrimethoxysilane To a three necked round bottom flask equipped with an overhead stirrer, a reflux condenser, a nitrogen inlet tion. The solution cast film was water insoluble.

Analytical

Moisture 25.65%
Ash (Na$_2$SO$_4$)-2.12%
Silicon 0.72%

This example shows that 88% hydrolyzed PVA reacts with isocyanatopropyltrimethoxysilane under mild conditions (at room temperature) to form an alkali soluble SIL PVA. By contrast, water and caustic insoluble SIL PVA results when 88% hydrolyzed PVA reacts with 3-glycidoxypropyltrimethoxysilane (GPTMS) in the presence of an alkali at elevated temperatures.

EXAMPLE 14

Preparation of SIL-PVA in Hexane Usinz Vinyltrimethoxysilane (VTMS)

Example 1 was repeated using vinyltrimethoxysilane (3 g). The silation was carried out at 60° C. for 5 h.

Analytical

Moisture-5.18%

Ash (Na$_2$SO$_4$)-5.24%
Silicon-0.6%

Properties

The product was soluble in hot water (65°-70° C.). A solution-cast film was insoluble in hot water.

EXAMPLE 15

Preparation of SIL PVA in Hexane Using VTMS in the Presence

Example 1 was repeated using the following reagents. The silation was carried out at 60° C for 6 h.
1. Hexane 600 g.
2. Sodium hydroxide-7.3 g.
3. Water 40 g.
4. Polyvinyl alcohol (Aldrich)-75 g ("as is") (100% hydrolyzed; mol. wt. ~14,000)
5. VTMS-9 g.

PROPERTIES

The SIL-PVA was soluble in hot water (65°-70° C). A solution cast film was insoluble in hot water.

ANALYTICAL

Moisture-9.02%
Ash (Na$_2$SO$_4$)-13.02%
Silicon-1.66%

EXAMPLE 16

Preparation of Silated Hydroxyethyl PVA (SIL HEPVA)

To a mixture of hexane (600 g) and caustic solution (8 g NaOH dissolved in 60 g of water) was added polyvinyl alcohol (100 g "as is") (Aldrich; 100% hydrolyzed; mol. wt. ~115,000). The resulting mixture was mixed at 20° C for 30 minutes to alkalize the PVA.

To the alkalized PVA slurry were added GPTMS (10 g) and ethylene oxide (80 g). The resulting reaction mixture was heated at 68° C for 5 h, cooled to room temperature and treated with glacial acetic acid (4 g). After filtering the reaction mixture, the residue was washed three times with acetone/water (80/20 w/w) mixture and finally dehydrated with acetone. The dehydrated polymer was dried in a fluid bed drier at 50° C. for 30 minutes.

Properties

The SIL HEPVA was partially (~90%) soluble in water. A solution-cast film was water resistant.

Analytical

Moisture-7.89%
Ash (Na$_2$SO$_4$)-9.07%
Silicon-0.9%

EXAMPLE 17

Preparation of Silated Carboxymethyl PVA (SIL CMPVA)

The SIL CMPVA was made in two stages as described below.

a. Preparation of Carboxymethyl PVA (CMPVA). To a mixture of t-butyl alcohol (588 g) and caustic solution (27 g of NaOH dissolved in 70 g of water) in a stainless steel pressure reactor was added PVA (100 g "as is") (Aldrich., 100% hydrolyzed; mol. wt. 86,000).

The resulting mixture was vigorously agitated at room temperature for 30 minutes to alkalize the PVA.

To the alkalized PVA slurry was added a solution of monochloroacetic acid (30 g) in butyl alcohol (50 g) over a period of 15 minutes and the resulting reaction mixture heated at 68° C. for 3 h. After cooling to room temperature, the reaction mixture was neutralized with 70% nitric acid (3 g), filtered and the residue washed three times with methanol/water (80:20 w/w mixture). The purified CMPVA was dried in a fluid bed drier at 50° C for 30 minutes.

Analytical

Moisture-4.2%
Ash (Na$_2$SO$_4$)-7.31%
Carboxymethyl Degree of Substitution-0.06 b. Silation of CMPVA

The above CMPVA was silated with GPTMS according to the procedure described in Example 2. The reagents used were a follows:
1. t-Butyl alcohol 588 g.
2. Sodium hydroxide 10 g.
3. Water-60 g.
4. CMPVA-80 g ("as is").
5. GPTMS-15 g.

Properties

The SIL-CMPVA was soluble in water. A solution cast film was water-resistant.

Analytical

Moisture 7.22%
Ash (Na$_2$SO$_4$)-17.07%
Silicon 0.97%

EXAMPLE 18

Preparation of SIL-PVA by the Reaction of PVA with 3-glycidoxypropylmethyldieth-oxysilane Example 1 was repeated using the following reagents. Glycidoxypropylmethyldimethoxysilane was used in place of GPTMS and the silation was done at 68° C. for 6 h.
1. Hexane-900 g.
2. Sodium hydroxide-12 g.
3. Water 90 g.
4. Polyvinyl alcohol (Aldrich-150 g "as is"). (100% hydrolyzed; mol. wt.~14,000).
5. 3 Glycidoxypropylmethyldimethoxysilane (Petrarch)-23 g.
6. Glacial acetic acid-8 g.

The SIL-PVA was soluble in hot water (90° C.). The solution-cast film was insoluble in boiling water.

Analytical moisture-4.98%
Ash (Na$_2$SO$_4$)-9.74%
Silicon 0.84%

EXAMPLE 19

Preparation of SIL-PVA by the Reaction of PVA with Bis(3-glycidoxypropyl)tegramethyldisiloxane Example 19 was repeated using the following reagents:
1. Hexane-900 g.
2. Sodium hydroxide-12 g.
3. Water-90 g.

4. Polyvinyl alcohol (Aldrich)-150 g ("as is") (100% hydrolyzed; mol. wt. 14,000)
5. Bis(3-glycidoxypropyl)tetramethyldisiloxane (Petrarch)-17 g.
6. Glacial acetic acid 10 g.

Properties

The SIL PVA was soluble in hot water (90° C.). A solution cast film was insoluble in water at room temperature but dissolved in hot water at 90° C.

Analytical

Moisture 5.02%
Ash($Na_2SO_4$)- 9.54%
Silicon-0.027%

EXAMPLE 20

Preparation of SIL PVA in (DMF) in the Presence of Pyridine Example 8 was repeated using pyridine (1 g) in place of NaOH.

The product isolated was soluble in water. A solution-cast film was water-soluble.

What is claimed is:

1. A water soluble silated polyvinyl alcohol homopolymer or copolymer having a degree of silyl substitution between 0.005 and 0.5 where the silated polyvinyl alcohol is further substituted with hydroxyethyl.

2. The silated polyvinyl alcohol of claim 1, where the copolymer comprises vinyl alcohol and vinyl acetate.

* * * * *